Figure 1:
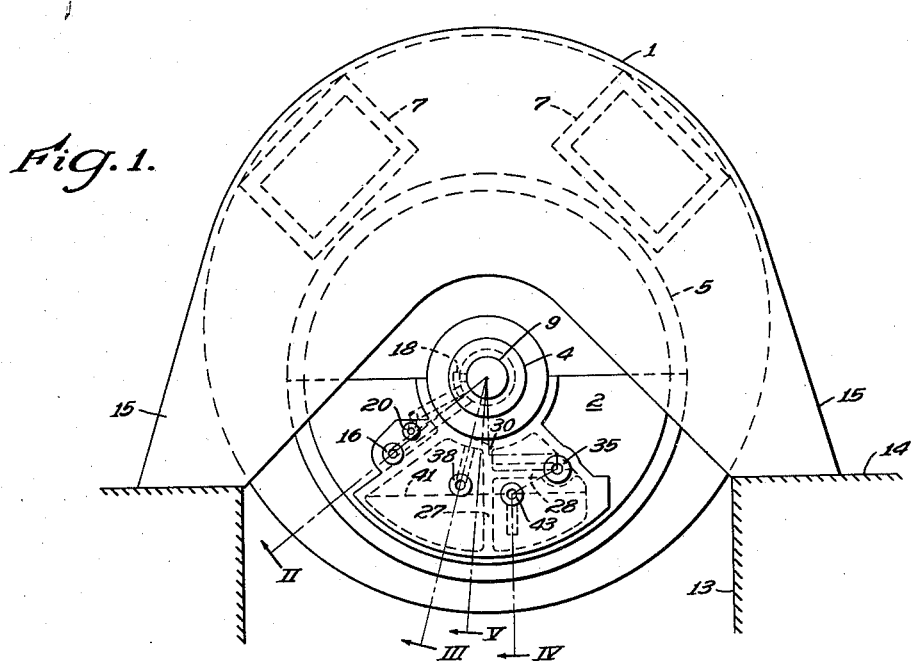

April 18, 1950 C. C. STERRETT 2,504,899
BEARING BRACKET FOR HYDROGEN-COOLED GENERATORS
Filed Feb. 17, 1948 3 Sheets-Sheet 1

WITNESSES:
Robert C Baird
Nw. G. Groome

INVENTOR
Charles C. Sterrett.
BY O. B. Buchanan
ATTORNEY

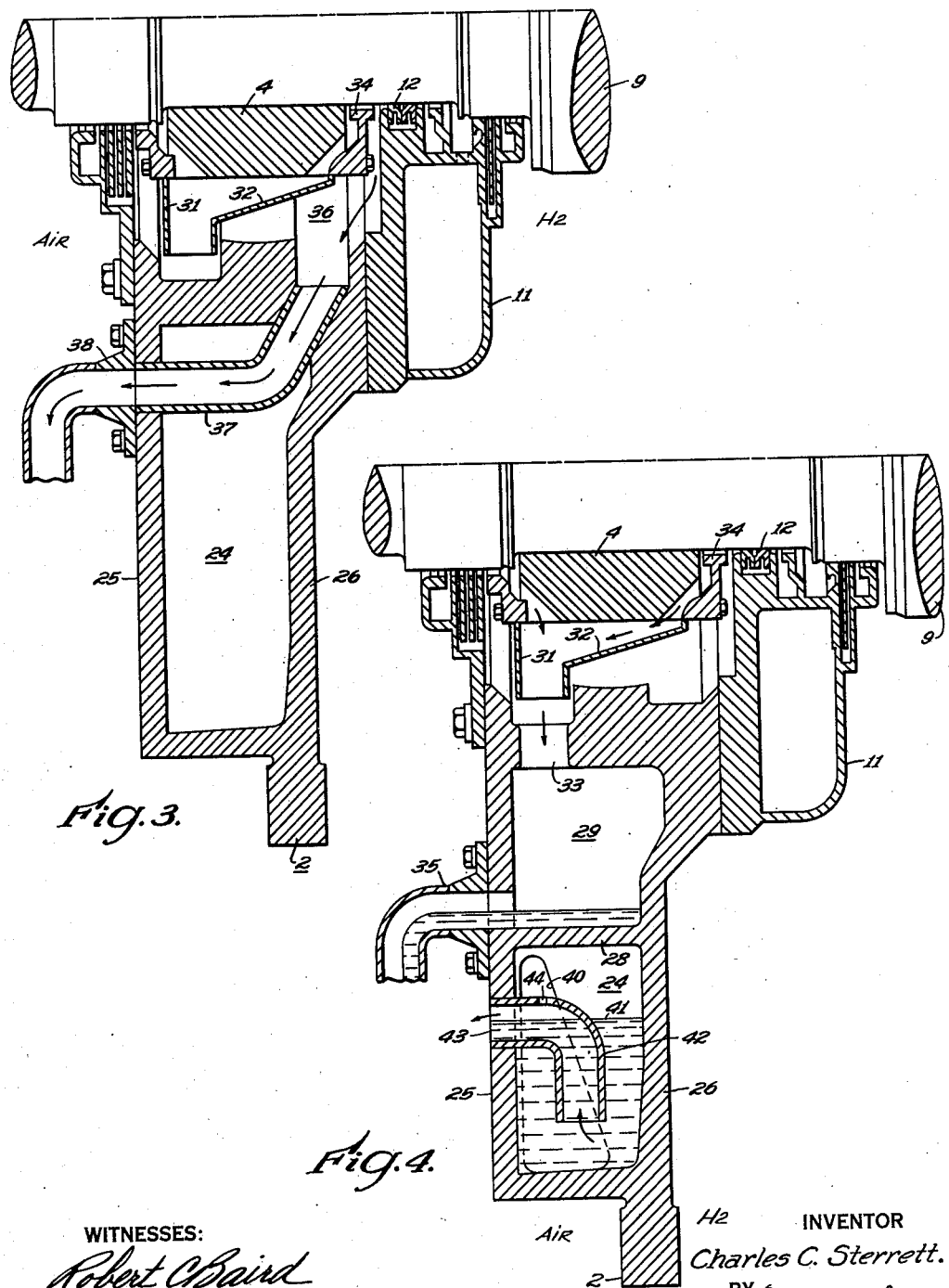

Patented Apr. 18, 1950

2,504,899

UNITED STATES PATENT OFFICE 2,504,899

BEARING BRACKET FOR HYDROGEN-COOLED GENERATORS

Charles C. Sterrett, Pittsburgh, Pa., assignor to Westinghouse Electric Corporation, East Pittsburgh, Pa., a corporation of Pennsylvania Application February 17, 1948, Serial No. 8,888

4 Claims. (Cl. 308—36.3)

My invention relates to hydrogen-cooled turbine-generators having either one or both of their bearing-brackets constructed with a hydrogen-defoaming tank therein.

A hydrogen-cooled turbine-generator requires an oil-seal, located inside of the bearings, to maintain the seal between the hydrogen-compartment and the outer-air zones. The bearing and seal-oil feeds are separate, as are also the respective drains. In fact, there are three separate drains, one from the two ends of the bearing, one from the air-side of the seal, and one from the hydrogen-side of the seal.

The oil leaving the bearings is foaming, and it is usual to provide a sump in which most of the air-bubbles may escape to the surface of this oil, and break. It is desirable for this defoaming-sump to have a large exposed oil-surface to facilitate the defoaming function, thus permitting the use of smaller drain-lines, for the recirculating oil-system, than would be required if the foaming oil were fed directly to the drain-line. This defoaming of the bearing-oil, after it leaves the bearing, also provides a more nearly constant oil-flow, because the drain-line is subjected to less air-bubbling and air-binding.

It has also been known that the air-side seal-oil drain-means should have some sort of drain-chamber or sump of sufficient size to provide for at least partially defoaming the sealing-oil therein. However, the oil-flow out of the air-side of the oil-seal is considerably smaller than the oil-flow through the bearing, so that a considerably smaller sump may be used in the air-side sealing-oil drain-system.

It has further been known that the hydrogen-side seal-oil drain-means requires a sump similar to the two drains already mentioned, except that it should be more efficient in its defoaming function, because the hydrogen-side seal-oil has come into very intimate contact with the hydrogen which fills the generator-housing, and thus this oil has absorbed a considerable amount of hydrogen. Proper defoaming-action will remove a large amount of this absorbed hydrogen and return it to the generator, rather than allowing it to pass, with the oil, down the drain-line. It is necessary, therefore, that the hydrogen-side defoaming-tank shall have a capacity sufficient to contain a large volume of oil, and should also provide a large horizontal exposed oil-surface at which the hydrogen-bubbles may break.

For many years heretofore, the provision of the various defoaming operations outlined above has necessitated a considerable amount of vent-piping and drain-piping connected externally to the bracket.

An object of my present invention is to provide a new type of bracket-design, requiring considerable modification of the bracket, but using space which would not otherwise have been used, and incorporating, in this space, a hydrogen-defoaming tank which meets the previously outlined requirements for such a tank, while being confined in a hollow space between the outside and inside walls of the bearing-bracket. This construction saves a great deal of previously required piping, it automatically partially cools the hydrogen-side seal-oil, because said oil leaves the seal at a temperature of approximately 75° C., whereas the inner wall of the bracket is in contact with the hydrogen which circulates within the machine-housing, at a temperature less than 40° C.

A more specific object of my invention is to provide a bearing-bracket, or a hydrogen-cooled machine having a bearing-bracket, in which all three of the defoaming tanks or sumps are provided within the confines of the bracket itself, and in which the several flanged-connections for the two oil-feed systems and the three drain-systems are in such positions as to be accessible from above the floor-line of a horizontal-shaft hydrogen-cooled turbine-generator or like machine.

Figure 2:
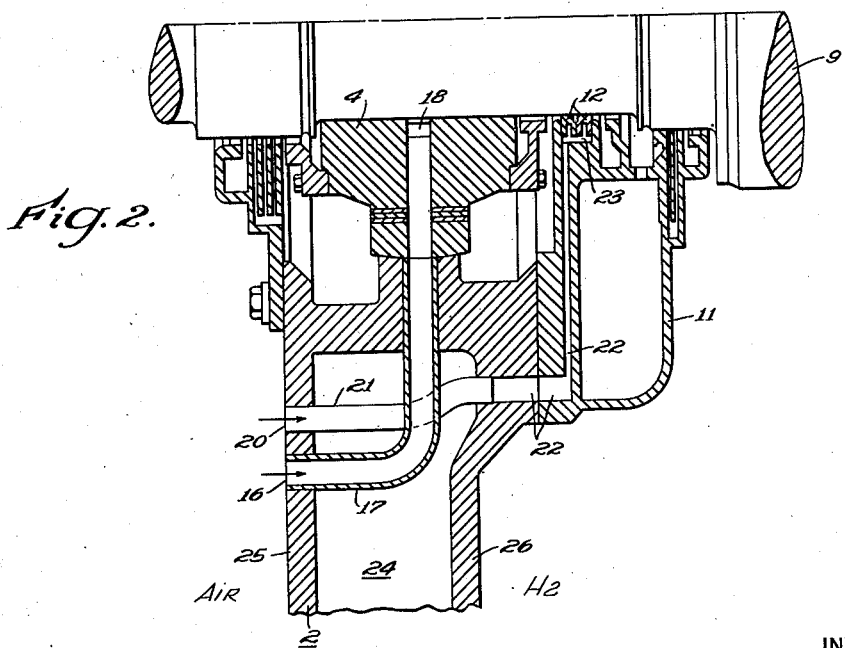

With the foregoing and other objects in view, my invention consists in the systems, combinations, structures, parts, and methods of design and operation, hereinafter described and claimed, and illustrated in the accompanying drawings wherein the several views indicate, to several different scales, various features of a somewhat simplified illustrative machine having a bearing-bracket embodying my invention; Fig. 1 being an end view; Fig. 2 being a partial sectional view, approximately on the plane indicated by the line II of Fig. 1, showing both the bearing-oil inlet-means and the seal-oil inlet-means; Fig. 3 being a partial sectional view, approximately on the section-line III of Fig. 1, showing the drain-means for the air-side seal-oil; Fig. 4 being a partial sectional view, approximately on the line IV of Fig. 1, showing the bearing-oil drain-system, and also showing the draining-means for the hydrogen-defoaming tank; and Fig. 5 being a partial sectional view, showing somewhat more of the bearing-bracket, on a section-plane approximately indicated at V in Fig. 1, showing the drain-means from the hydrogen-side of the seal to the hydrogen-defoaming tank.

Figure 5:
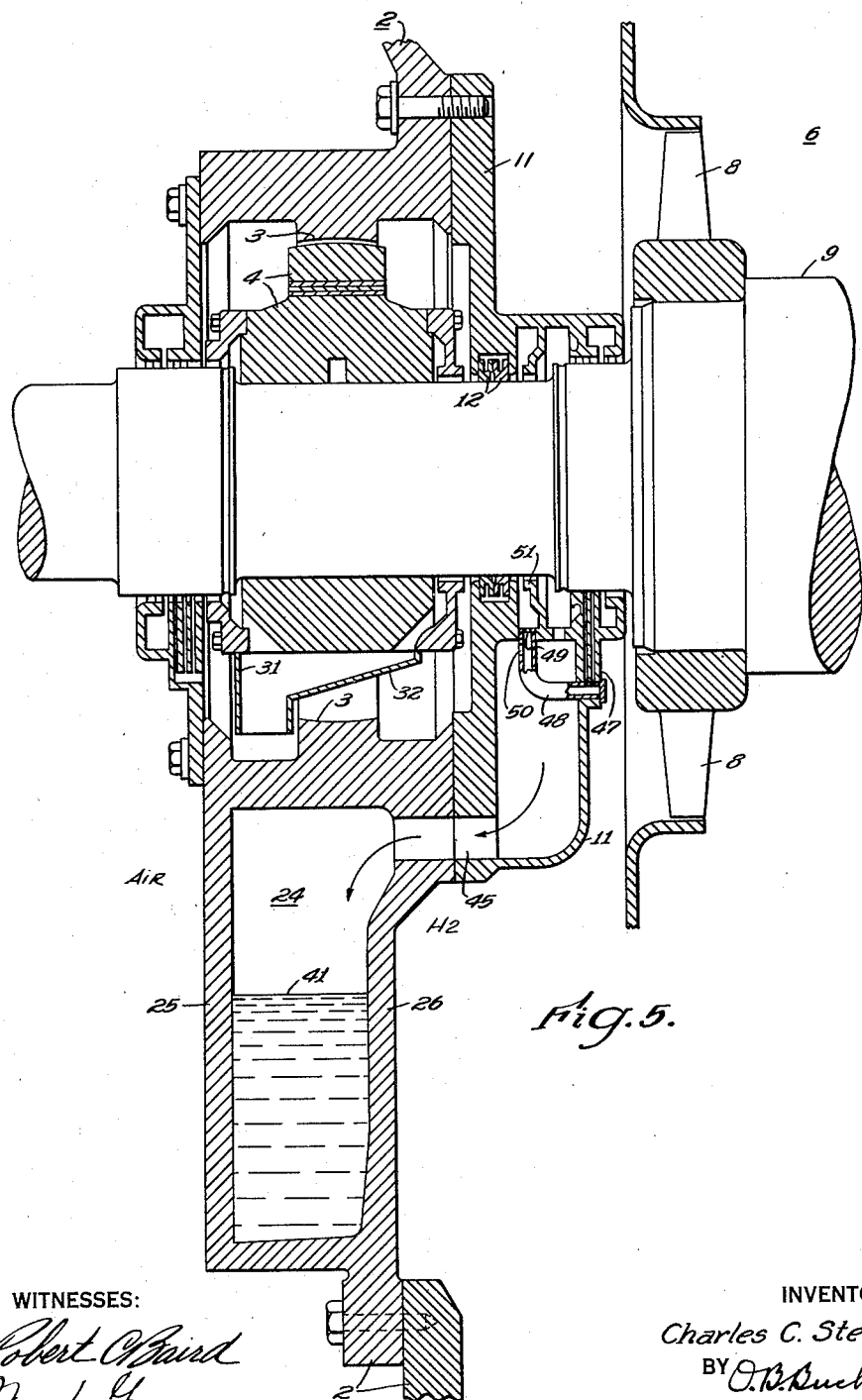

In the drawing, I have shown one end of a hydrogen-cooled machine having a substantially hermetically tight, hydrogen-filled housing 1, including a substantially upright bearing-bracket 2. The bearing-bracket has a bearing-receiving opening 3 therein, in which is disposed an oil-lubricated bearing 4, as shown in Fig. 5. The machine is illustrated as a hydrogen-cooled generator having a stator 5 (Fig. 1) and a rotor 6 (Fig. 5), these generator-parts being included within the hydrogen-filled housing 1, which also includes one or more coolers 7 (Fig. 1) for cooling the hydrogen which is recirculated within the machine, as by means of fans 8 (Fig. 5) located on the shaft 9 at each end of the rotor 6, within the housing 1. The shaft 9 is disposed substantially horizontally, and is rotatably journalled in the bearing 4, through which the shaft extends from the inside to the outside of the housing.

As is usual in such machines, a gland-seal structure 11 (Fig. 5) is provided, being illustrated as being secured to the inside of the bearing-bracket 2 in position to provide an oil-tight gland-seal 12 which surrounds the shaft at a point on the hydrogen-side of the bearings. This gland-seal provides for a circulation of oil from the center of the seal, where it surrounds the shaft, with the oil moving in both directions along the shaft, that is, both toward the air-end of the seal and toward the hydrogen-end of the seal, as is known in the art.

I have illustrated my invention in connection with a large machine, the lowermost portions of which extend down into a pit 13 (Fig. 1) which is provided under the floor-level 14, the machine being supported on feet 15 which rest on the floor.

As shown in Fig. 1, the several inlet and drain openings and connections are provided in the bearing-bracket 2 at a level which is above the floor-level 14, or at a level which is readily accessible from the floor-level 14 being all grouped in the portion of the bracket which is below the bearing 4.

As shown more particularly in Fig. 2, I provide a bearing-oil inlet-means 16, which is connected by a pipe 17 to an arcuate groove 18 which is provided in the lower half of the bearing 4, as shown also in Fig. 1, so as to carry the feed-oil part way up around the bearing, then introducing it to the surface of the shaft, from which point it is distributed in both directions along the shaft, and around the bearing, to lubricate the bearing. Fig. 2 also shows a seal-oil inlet-means 20, which is connected by a pipe 21 to a lower portion of the bottom half of the gland-seal structure 11, from which point suitably drilled holes 22 carry this oil up to an annular chamber 23 surrounding the seal 12. From the chamber 23 the oil enters through the seal to the surface of the shaft, and then divides, flowing in opposite directions along the shaft to the respective ends of the seal.

As shown in the several sectional views, particularly Figs. 3, 4 and 5, my bearing-bracket 2 is specially constructed, particularly in the portion underneath the bearing 4, so as to provide various drain-means and defoaming-tanks or sumps. To this end, this portion of the bearing-bracket 2 is made hollow, with a hollow space 24 (Figs. 4 and 5), provided between the outside and inside walls 25 and 26 of the bracket, immediately below the bracket-portion which provides the bearing-receiving opening 3. This hollow space 24 is subdivided into various chambers (two of which are interconnected), by means of a vertical wall or partition 27 (Fig. 1) extending from the top to the bottom of the hollow space 24, and a shelf-like partition or horizontal wall 28 (Fig. 1), the position of which is more clearly indicated in Fig. 1, for providing a smaller compartment or tank 29 (Fig. 4) in the top portion of the hollow space 24, and beneath the underside of the bearing or bearing-receiving opening 3, this smaller compartment or tank extending partway up around under the bearing, at one side of the lowermost point 30 (Fig. 1) of the bearing.

This smaller compartment or tank 29 is thus bounded, on the top, by the portions of the bracket which provide the bearing-receiving opening 3, the upper portion of the vertical wall 27, the shelf-like partition 28, and the outer and inner walls 25 and 26 of the bearing-bracket 2. In accordance with my invention, I use this smaller compartment or tank 29 as a defoaming-sump, which is a part of the bearing-oil drain-means, as shown more particularly in Fig. 4. The oil which is discharged from the two ends of the bearing 4 is directed, as by means of baffles 31 and 32, to an opening 33, and thence into the top of the defoaming-sump or tank 29. It will be noted that the baffle 32 is carried by the lower end of an oil-separator ring 34 which is mounted on the inner end of the bearing 4, so as to surround the shaft 9 at a point between the inner end of the bearing 4 and the air-side end of the gland-seal 12. The front or outside wall 25 of the bracket is provided with a bearing-oil drain-connection 35 which is in communication with the bottom portion of the defoaming-sump 29, for draining the bearing-oil therefrom.

As shown more in detail in Fig. 3, a separate drain-means is provided for the air-side sealing-oil. To this end, the space between the oil-separator ring 34, its baffle 32, and the gland-seal structure 11, underneath the shaft 9, constitutes a drain-chamber 36 which communicates with the air-side end of the seal 12, between the seal and the bearing. The lower end of this drain-chamber 36 communicates with a drain-pipe 37, which leads to the air-side seal-oil drain-connection 38, externally of the bearing-bracket 2. The upper part of the drain-chamber 36 is enlarged sufficiently to provide for at least partially defoaming the sealing-oil therein, as it flows down over the walls of this chamber into the drain-pipe 37. As the rate of flow of the seal-oil is relatively slow, and as the recovery of entrapped air therefrom is not particularly important, in this portion of the general oil-circulating and oil-treatment system (not shown) which is commonly provided for hydrogen-cooled machines, this relatively small drain-chamber 36, in approximately the proportions shown in the drawings, is generally sufficient to provide the defoaming-tank or chamber or sump which is required in the air-side seal-oil drain-means or system.

It is perhaps the most important or essential novel feature of my invention, that I provide a large hydrogen-defoaming tank in the drain-means for the hydrogen-side end of the seal 12. According to my invention, this hydrogen-defoaming tank comprises all of the hollow space 24 of the bearing-bracket 2, except the bearing-oil defoaming-sump or compartment 29 which is closed off by the shelf-like partition 28 and the upper portion of the vertical partition-wall 27.

The two halves of this hollow space 24, which are separated by the vertical partition-wall 27, are in communication with each other, through a large hole 40 (Fig. 4) in the lower portion of said vertical wall 27, as shown in Fig. 4. This hydrogen-defoaming tank 24 is large enough to provide for a considerable depth of oil therein, so that the oil-level 41 extends at a considerable height above the bottom of the tank. The drain-means for this hydrogen-defoaming tank 24 is shown in the form of a bent pipe 42 which extends from a point considerably beneath the oil-level 41 to the hydrogen-side seal-oil drain-connection 43 in the front or outside wall 25 of the bearing-bracket 2. As will be readily understood, and as shown in Fig. 4, the upper portion of the bent drain-pipe 42 is provided with a vent 44 to the gas-filled portion of the tank 24.

The communication between the upper, or gas-filled, portion of the hydrogen-defoaming tank 24 and the hydrogen-side of the seal 12 is indicated in Fig. 5, wherein it is shown that the bottom half of the gland-seal structure 11 is hollow; and a communicating-opening 45 is provided, between the bottom of this hollow portion of the gland-seal structure 11 and the top of the hydrogen-defoaming tank 24, for the seal-oil which escapes along the shaft from the hydrogen-side of the seal 12.

Fig. 5 also shows another feature, which is more particularly described and claimed in my copending application Serial No. 574,547, filed January 25, 1945, now Patent Number 2,470,664, whereby a labyrinth-seal 47 is provided, surrounding the shaft 9 at a point spaced from the inner end of the gland-seal structure, or the end toward the inside of the machine, this labyrinth-seal being kept primed with oil, by means of a gooseneck which is provided with a pipe 48 having a small inlet-opening 49 in its top, and having an outlet-opening 50 in its side near its top, for pouring oil out into the hollow lower portion of the gland-seal structure 11. As explained in my copending application, just before the machine is first put into operation, when there may not be sufficient oil, or any oil, in the labyrinth-seal 47, the oil-circulating means is started, and the oil which comes out of the hydrogen-side of the seal 12 is caught by an oil-separator 51 and directed down into the inlet-opening 49 at the top of the pipe 48 which connects to the bottom of the labyrinth-seal 47, thus filling said seal with oil, and preventing gas from flowing up through the drain-holes of the labyrinth and thus carrying oil through the seal.

In the operation of my present invention, it will be noted that I have accomplished the objects set forth in the introductory portion of my description. The front or outside wall 25 of the portion of my bearing-bracket which is beneath the bearing 4 is provided with two inlet-means 16 and 20, for the bearing-oil and the seal-oil, respectively; and it is also provided with three drain-connections 35, 38 and 43, for the bearing-oil, the air-side seal-oil, and the hydrogen-side seal-oil, respectively. These drain-connections are adapted to be connected, externally of the bracket, to the general oil-pumping, oil-purification, and oil-cooling system (not shown), which is a known part of the equipment for hydrogen-cooled machines. It is to be noted that these connections are all disposed in positions which are readily accessible from above the floor-level 14.

It will also be noted that I have provided a bearing-bracket containing three separate defoaming-chambers or tanks or sumps, 24, 29, and 36, which provide the necessary defoaming functions for the hydrogen-side seal-oil, the bearing-oil, and the air-side seal-oil, respectively.

It is to be noted that these various connections and defoaming-chambers or tanks are conveniently provided, in the bracket-structure itself, so that the bearing-bracket 2 is complete, with all of the necessary connections and tanks, which is in sharp contrast with the practice which has heretofore become a standard for a long period of years, thus saving a great deal in the way of the cost and maintenance of several external drain and vent pipes outside of the bearing-bracket, and also providing a construction in which the necessary connections to which more or less frequent access must be had, are all provided in positions which can be readily reached from above the floor-level 14.

It is also to be noted that my mounting of the hydrogen-defoaming tank 24 within an enlarged portion of the bearing-bracket 2 provides a means for at least partially cooling the hydrogen-side sealing-oil, and to a less extent the drainage-oil from the bearing, this cooling-action being obtained from the hydrogen which is circulated within the machine, and which is kept cooled by the machine-coolers 7, thus relieving some of the cooling-duty on the oil-coolers (not shown) which are commonly used in the oil-circulating system (not shown).

These several advantages are all obtained at a relatively small extra cost, with considerable space-saving, because the enlarged hollow portion of my end-bracket 2 occupies a space which was otherwise wasted. The cost of my bracket-construction is slight, because it can be made from a combination of castings and welded-on slabs and other parts, as shown in the drawings, at only a relatively slight increase in cost, as compared with previous bracket-constructions.

While I have illustrated my invention in but a single exemplary form of embodiment, I wish it to be understood that my invention is not limited, in all of its details, to the particular configurations which are shown in the drawings, as many changes may be made, in the way of additions, omissions and the substitution of equivalents, without departing from the essential spirit of my invention. I desire, therefore, that the appended claims shall be given the broadest construction consistent with their language.

I claim as my invention:

1. A hydrogen-cooled machine having a substantially hermetically tight, hydrogen-filled housing including a substantially upright bearing-bracket, said bearing-bracket having a bearing-receiving opening therein, an oil-lubricated bearing disposed in said opening, a substantially horizontal, rotatable shaft extending through said bearing, a gland-seal structure secured to the inside of the bearing and bearing-bracket structure in position to provide a gland-seal surrounding the shaft at a point on the hydrogen-side of the bearing, means for feeding lubricating-oil to said bearing, and means for feeding sealing-oil to said seal, said bearing-bracket having a structural shape, underneath the bearing, such as to provide a drain-means for the bearing-oil, a separate drain-means for the air-side sealing-oil, and a separate drain-means for the hydrogen-side sealing-oil, the hydrogen-side sealing-oil drain-means comprising a hydrogen-defoaming tank disposed in a hollow space between the outside and inside walls of the bearing-bracket, means for draining sealing-oil from the hydrogen-side of the seal to an upper portion of said hydrogen-defoaming tank, and means for so draining the hydrogen-defoaming tank that only liquid is withdrawn and so that liquid is at all times maintained in said hydrogen-defoaming tank, said hydrogen-side sealing-oil draining-means also providing a gaseous communication between the upper part of the hydrogen-defoaming tank and the interior of the hydrogen-filled housing of the machine.

2. The invention as defined in claim 1, characterized by said bearing-oil drain-means comprising a defoaming-sump disposed in a space within said bearing-bracket, and means for draining bearing-oil from the bottom of said defoaming-sump.

3. The invention as defined in claim 1, characterized by said bearing-oil drain-means comprising a defoaming-sump disposed in a space within said bearing-bracket, and means for draining bearing-oil from the bottom of said defoaming-sump, said defoaming-sump being disposed above a portion of the hydrogen-defoaming tank, and beneath the underside of the bearing, extending partway up around under the bearing at at least one side of the lowermost point of the bearing.

4. The invention as defined in claim 1, characterized by said bearing-oil drain-means comprising a defoaming-sump disposed in a space within said bearing-bracket, and means for draining bearing-oil from the bottom of said defoaming-sump; and said air-side sealing-oil drain-means comprising a drain-chamber communicating with the air-side of the seal, between the seal and the bearing, and means for draining sealing-oil from the bottom of said drain-chamber, the upper part of said drain-chamber being enlarged sufficiently to provide for at least partially defoaming the sealing-oil therein.

CHARLES C. STERRETT.

REFERENCES CITED

The following references are of record in the file of this patent:

UNITED STATES PATENTS

| Number | Name | Date |
|---|---|---|
| 2,236,274 | Rice | Mar. 25, 1941 |
| 2,253,350 | Ross | Aug. 19, 1941 |